US012548687B2

(12) United States Patent
Heibel (10) Patent No.: US 12,548,687 B2
(45) Date of Patent: Feb. 10, 2026

(54) USE OF SUB-CRITICAL NEUTRON MULTIPLICATION DRIVEN BY ELECTRONIC NEUTRON GENERATORS TO PRODUCE RADIOISOTOPES

(71) Applicant: Westinghouse Electric Company LLC, Cranberry Township, PA (US)

(72) Inventor: Michael D. Heibel, Broomfield, CO (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 105 days.

(21) Appl. No.: 17/807,067

(22) Filed: Jun. 15, 2022

(65) Prior Publication Data

US 2023/0411034 A1    Dec. 21, 2023

(51) Int. Cl.
*G21G 1/06*    (2006.01)
*G21G 4/02*    (2006.01)

(52) U.S. Cl.
CPC ............... *G21G 1/06* (2013.01); *G21G 4/02* (2013.01)

(58) Field of Classification Search
CPC ......... G21C 19/07; G21C 19/40; G21F 5/005; G21F 5/008; G21F 5/015; G21F 5/10; G21G 1/06; G21G 4/02; G21K 5/08
USPC .............. 376/158, 186, 202, 272; 250/491.1, 250/492.1, 522.1
See application file for complete search history.

(56) References Cited

U.S. PATENT DOCUMENTS

| | | | |
|---|---|---|---|
| 10,978,214 B2 * | 4/2021 | Piefer | G21G 1/08 |
| 2014/0153684 A1 | 6/2014 | Mackie et al. | |
| 2016/0042826 A1 | 2/2016 | Baldasaro | |
| 2017/0236607 A1 | 8/2017 | Tsang | |
| 2023/0125432 A1 * | 4/2023 | Lee | H05H 3/06 376/108 |

FOREIGN PATENT DOCUMENTS

| | | | | |
|---|---|---|---|---|
| WO | WO-0072329 A2 * | 11/2000 | | G21G 1/12 |
| WO | WO-2016037656 A1 * | 3/2016 | | G21G 1/06 |

OTHER PUBLICATIONS

Ren, Lei, et al. "Neutronics analysis of a stacked structure for a subcritical system with LEU solution driven by a DT neutron source for 99Mo production." Nuclear Science and Techniques 32.11 (2021): 123. (Year: 2021).*
International Search Report and Written Opinion for corresponding International PCT Application No. PCT/US2023/068510, dated Sep. 20, 2023.

* cited by examiner

*Primary Examiner* — Jinney Kil
(74) *Attorney, Agent, or Firm* — K&L Gates LLP (57) ABSTRACT

A target irradiation apparatus for producing radioisotope sources is provided. The target irradiation apparatus comprises a containment vessel, a plurality of electronic neutron generator inserts and a removable neutron enhancement cartridge. The containment vessel comprises an inner surface, an outer surface, a first end, a second end, a body section, and a support member. Each of the plurality of electronic neutron generator insert devices is inserted into one of a plurality of openings of the body section while the removable neutron enhancement cartridge is adapted to be positioned inside of the containment vessel. A radioisotope production system comprising a target irradiation apparatus and a method for producing radioisotope sources are also provided.

17 Claims, 5 Drawing Sheets

USE OF SUB-CRITICAL NEUTRON MULTIPLICATION DRIVEN BY ELECTRONIC NEUTRON GENERATORS TO PRODUCE RADIOISOTOPES

BACKGROUND

The development and implementation of many new radiotherapy treatments relies on a readily available supply of medical radioisotopes. Medical radioisotopes are typically produced by irradiating a parent isotope with very large populations of neutrons. Conventional methods for generating a sufficient neutron population to reliably produce medical radioisotopes require an operating nuclear reactor. However, obtaining access to operating nuclear reactors for producing short half-life medical radioisotopes is limited and therefore, reliably and economically producing medical radioisotopes on demand proves to be a difficult endeavor. Alternative sources for generating neutron populations, such as, for example, Electronic Neutron Generators, are not able to produce a neutron flux effective for commercial medical radioisotope production at scale. A need exists to develop alternative neutron generation systems and operating methods thereof to optimize the reliability and economics of medical radioisotope production.

SUMMARY

The following summary is provided to facilitate an understanding of some of the innovative features unique to the aspects disclosed herein, and is not intended to be a full description. A full appreciation of the various aspects disclosed herein can be gained by taking the entire specification, claims, and abstract as a whole.

In various aspects, a target irradiation apparatus for producing radioisotope sources is disclosed. In some aspects, the target irradiation apparatus includes a containment vessel having an inner and outer surface, a plurality of electronic neutron generator (hereinafter referred to as "ENG") insert devices, and a removable neutron enhancement cartridge. In some aspects, the containment vessel includes a first end; a second end comprising a plurality of penetrations extending from the outer surface to the inner surface, wherein the second end is adapted to couple to transfer system for an irradiation target insert; a body section extending between the top end and the bottom end, the body section comprising a plurality of openings, wherein each of the plurality of openings is adapted to fit a radiation shield plug; and a support member, the support member comprising a plurality of channels, wherein the channels are in alignment with the penetrations of the second end, wherein a first face of the support member is oriented towards the inner surface of the second end. In some aspects, each of the plurality of ENG insert devices of the target irradiation apparatus is inserted into one of the plurality of openings of the body section. In some aspects the removable neutron enhancement cartridge is positioned on a second face of the support member. In some aspects, the neutron enhancement cartridge comprises a cell structure and a neutron enhancer assembly. In some aspects, the cell structure comprises a plurality of panels, wherein the plurality of panels is configured to form at least one cell volume, and wherein each of the plurality of panels comprises an outer metallic shell. In some aspects, the neutron enhancer assembly is configured to be removably inserted into the at least one cell volume and wherein the neutron enhancer assembly is adapted to house an irradiation target insert in alignment with one of the plurality of channels of the support member.

In various aspects, a radioisotope production system for producing radioisotope sources is disclosed. In some aspects, the radioisotope production system comprises a neutron multiplication apparatus, at least one removable neutron enhancement cartridge and a detachable transfer system for an irradiation target insert. In some aspects, the neutron multiplication apparatus comprises a containment vessel having an inner surface and an outer surface; and a plurality of electronic neutron generator insert devices. In some aspects, the containment vessel comprises a top end comprising a removable vessel lid; a bottom end comprising a plurality of longitudinally oriented openings extending from the outer surface to the inner surface, wherein the bottom end is adapted to couple to an irradiation target insert transfer system; a body section extending longitudinally between the top end and the bottom end, the body section comprising a plurality of side openings, wherein each of the plurality of side openings is adapted to fit a radiation shield plug; and a bottom support member positioned on the inner surface above the bottom end, the bottom support member comprising a plurality of longitudinally oriented channels, wherein the longitudinally oriented channels are in alignment with the longitudinally oriented openings of the bottom end. In some aspects, each electronic neutron generator insert device is inserted into one of the plurality of side openings of the body section. In some aspects, the at least one removable neutron enhancement cartridge is adapted to fit on the bottom support member inside the containment vessel of the at least one neutron multiplication apparatus. In some aspects, the at least one removable neutron enhancement cartridge comprises a cell structure comprising an array of cell volumes, wherein each cell volume is configured to house a neutron enhancer assembly, wherein the neutron enhancer assembly is adapted to house an irradiation target insert in alignment with one of the plurality of longitudinally oriented channels of the bottom support member. In some aspects, the detachable transfer system for an irradiation target insert is adapted to move the irradiation target through the bottom end of a containment vessel.

In various aspects, a method for producing a radioisotope source is disclosed. In some aspects, the method comprises initializing a radioisotope production system and producing a radioisotope source. In some aspects, initializing a radioisotope production system comprises submerging a first neutron enhancement cartridge in a spent fuel pool; populating the first neutron enhancement cartridge with at least one spent fuel assembly, wherein the freshly populated first neutron enhancement cartridge has a neutron reproduction factor $K_{eff}$; submerging an open radioisotope production system into the spent fuel pool, the open radioisotope production system comprising an array of electronic neutron generator insert devices; loading the freshly populated first neutron enhancement cartridge into the submerged radioisotope production system; closing the loaded radioisotope production system; and inserting an irradiation target into the closed radioisotope production system. In some aspects, producing a radioisotope source comprises providing power to the array of electronic neutron generator insert devices to irradiate the inserted irradiation target; and withdrawing the irradiated target from the closed radioisotope production system to produce the radioisotope source.

These and other objects, features, and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of any of the aspects disclosed herein.

BRIEF DESCRIPTION OF THE DRAWINGS

The various aspects described herein, together with objects and advantages thereof, may best be understood by reference to the following description, taken in conjunction with the accompanying drawings as follows.

Corresponding reference characters indicate corresponding parts throughout the several views. The exemplifications set out herein illustrate various aspects of the present disclosure, in one form, and such exemplifications are not to be construed as limiting the scope of any of the aspects disclosed herein.

DETAILED DESCRIPTION

Certain exemplary aspects of the present disclosure will now be described to provide an overall understanding of the principles of the composition, function, manufacture, and use of the compositions and methods disclosed herein. An example or examples of these aspects are illustrated in the accompanying drawing. Those of ordinary skill in the art will understand that the compositions, articles, and methods specifically described herein and illustrated in the accompanying drawing are non-limiting exemplary aspects and that the scope of the various examples of the present invention is defined solely by the claims. The features illustrated or described in connection with one exemplary aspect may be combined with the features of other aspects. Such modifications and variations are intended to be included within the scope of the present invention.

Reference throughout the specification to "various examples," "some examples," "one example," "an example," or the like, means that a particular feature, structure, or characteristic described in connection with the example is included in an example. Thus, appearances of the phrases "in various examples," "in some examples," "in one example," "in an example," or the like, in places throughout the specification are not necessarily all referring to the same example. Furthermore, the particular features, structures, or characteristics may be combined in any suitable manner in an example or examples. Thus, the particular features, structures, or characteristics illustrated or described in connection with one example may be combined, in whole or in part, with the features, structures, or characteristics of another example or other examples without limitation. Such modifications and variations are intended to be included within the scope of the present examples.

In the following description, like reference characters designate like or corresponding parts throughout the several views of the drawings. Also in the following description, it is to be understood that such terms as "forward," "rearward," "left," "right," "above," "below," "upwardly," "downwardly," and the like are words of convenience and are not to be construed as limiting terms.

Radioisotopes are unstable isotopes of elements having excess nuclear energy. Consequently, radioisotopes emit their excess nuclear energy through various decay modes at decay rates typically characterized as half-lives. Radioisotopes are employed in various commercial applications such as, for example, nuclear medicine, food preservation, industrial manufacturing and geological dating. Medical radioisotopes are typically short lived. For example, Molybdenum-99 is a medical radioisotope having a half-life of about 66 hours. In general, medical radioisotopes are synthetically produced as fission products or induced radioisotopes. For example, after a fission event in a nuclear reactor containing Uranium-235, the remaining fission products and unreacted Uranium-235 can be extracted and Molybdenum-99 separated therefrom.

Alternatively, a neutron flux source can be employed to induce a short-lived radioactivity in a stable isotope. A neutron source's ability to activate a stable isotope in a given amount of time is dependent on the source's thermal neutron flux and the isotope's neutron absorption characteristics. Although commercially available ENG's, such as, for example, ENG's employing Deuterium-Tritium fusion, can also be used to produce radioisotopes, these ENG's do not typically produce a flux effective for producing medical radioisotopes at a commercial scale. For example, a thermal neutron flux on the order of $10^{11}$ neutrons/cm$^2$/second is suitable for commercial production of medical radioisotopes including Molybdenum-99, Lutetium-177, and Actinium-225. However, ENG's employing Deuterium-Tritium fusion have a typical neutron flux on an order of $10^9$ neutrons/cm$^2$/second. Thus, a commercial production of medical radioisotopes typically employs a nuclear reactor able to provide the sufficient neutron flux for neutron activation. For example, an irradiation target comprising a stable Molybdenum-98 isotope can be inserted into the fuel assembly of an operating nuclear reactor, wherein the Molybdenum-98 absorbs some of the free neutrons produced therein to form an unstable Molybdenum-99 activation product, and withdrawn from the fuel assembly thereafter.

In the context of nuclear reactors, fissile fuels are split into a plurality of daughter radioisotopes, thereby releasing a first generation of free neutrons. At least a portion of the first neutron generation is absorbed by other nuclei, thereby triggering another fission event and a second neutron generation. A neutron reproduction factor $K_{eff}$ for a specific array of fissile fuel assemblies represents the ratio of the neutrons produced by fission in one neutron generation to the number of neutrons lost through absorption in the preceding neutron generation. During an initial loading of reactor fuel assemblies into a reactor vessel, neutron levels present inside the reactor vessel and step changes thereof are monitored with a Source Range detector and/or a $BF_3$ neutron detector as each fuel assembly is placed in the reactor core. The changes, attributed to an addition of a fuel assembly and the positioning thereof within the array, are used to confirm a predicted $K_{eff}$ value.

Discharge burnup during the useful lifetime of a fuel assembly gradually reduces the $K_\infty$ of the fuel assembly down to an unusable reactivity. For example, after about 48 GWd/MTU of discharge burnup, a fuel assembly having an initial enrichment of 5% Uranium-235 will have a $K_\infty$ value as high as about 0.99, thereby indicating the spent fuel assembly is no longer able to achieve critical reactivity. A lengthy reactor shutdown procedure is initiated and the spent fuel assemblies are removed from the reactor thereafter to be stored underwater in a spent fuel pool.

Employing an operating reactor as a neutron source for producing medical radioisotopes presents certain complications regarding operation and safety. Normally, an operating reactor is controlled to maintain a critical state wherein $K_{eff}$ is equal to 1.0 and neutrons are produced in a stable, self-sustained fission chain reaction without a source neutron flux. Strict control of an operating nuclear reactor is necessary to maintain a stable operating state and avoid catastrophic runaway of neutron reproduction, especially when components affecting reactivity within the reactor are perturbed. For example, insufficient absorption of neutrons by secondary nonfissile reactor elements including burnable absorbers and control rods may lead to a supercritical reactor state having a $K_{eff}$ greater than 1.0 wherein the neutron population grows exponentially at an extremely rapid rate.

Obtaining access to an operating nuclear reactor for the abovementioned radioisotope production routes can be costly and difficult to obtain. Additionally, maintaining control of nuclear chain reactions requires a stringent adherence to special safety precautions due to the inherent danger of a self-sustaining fission reaction. ENG devices are readily available but cannot provide the appropriate neutron flux for reliably producing medical radioisotopes at scale. Accordingly, various aspects of the present disclosure provide various methods and devices for readily and safely producing medical radioisotopes without sacrificing production rate.

Various methods and devices provided by the present disclosure optimize the technical and economic aspects of producing medical radioisotopes, for example, neutron activation of irradiation targets. In some implementations, the optimization can advantageously incorporate the upcycling of waste products from nuclear energy production to provide a more accessible and/or reliable supply of medical radioisotopes over conventional medical radioisotope production.

Figure 1:
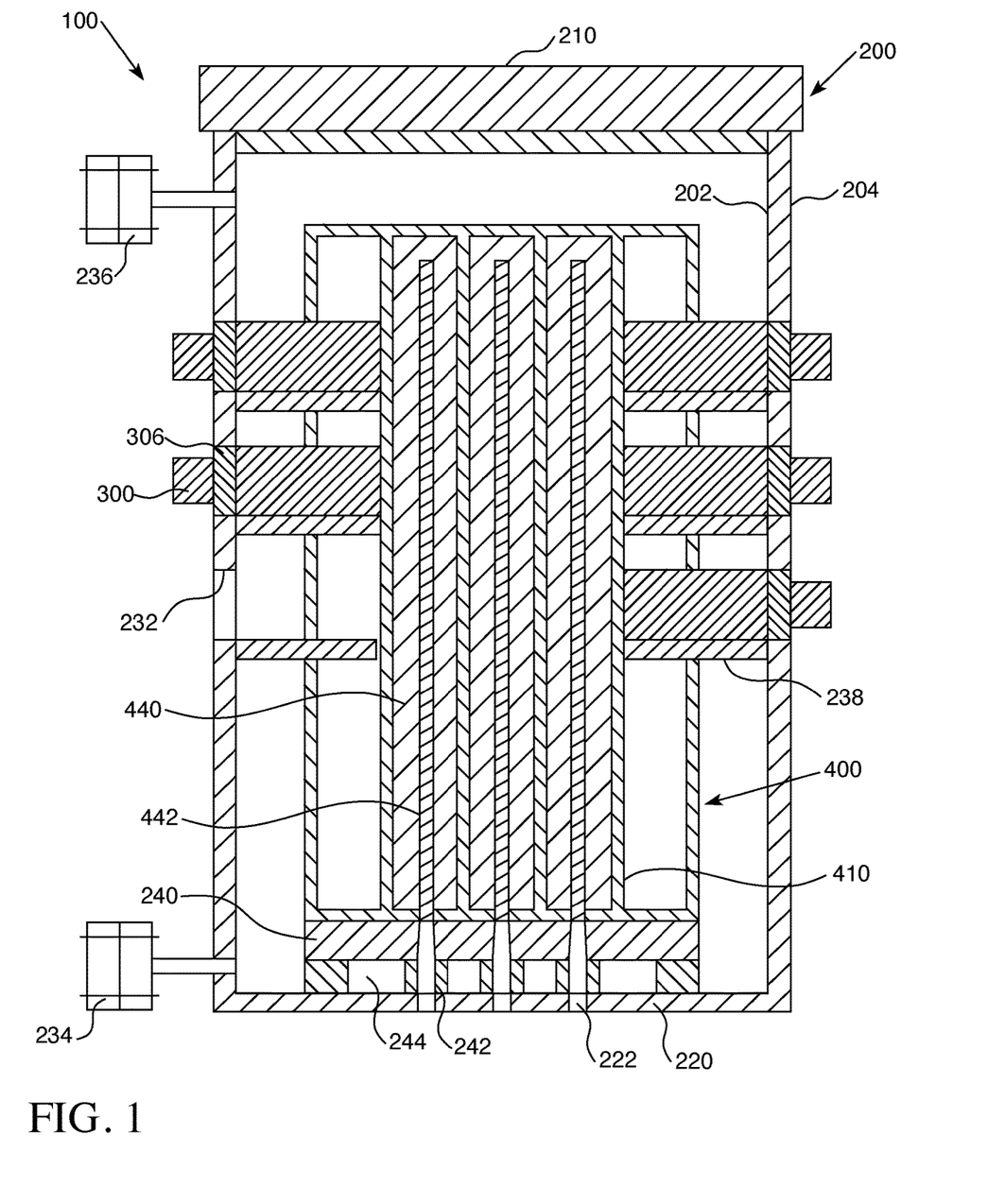
FIG. 1 is a schematic representation of an axial cross section of a radioisotope production system, in accordance with at least one non-limiting aspect of the present disclosure.

FIG. 1 depicts a schematic view of a target irradiation apparatus 100, in accordance with at least one non-limiting aspect of the present disclosure. The target irradiation apparatus 100 includes a containment vessel 200, a plurality of ENG insert devices 300, and a removable neutron enhancement cartridge 400. In various examples, the containment vessel 200 can include an inner surface 202, an outer surface 204, a first end 210, a second end 220, a body section 230, and a support member 240.

In various examples, the first end 210 can be configured as the top end of the containment vessel 200. The first end 210 of the containment vessel can be adapted to provide access to the inside of the vessel. For example, the first end 210 can be removably attached to the body section 230. In some examples, the first end 210 can be configured as a removable vessel lid. In certain examples, the first end 210 can be configured with a seal to substantially isolate the interior of the containment vessel 200. The configuration of the first end 210 can facilitate transfer of some components into and/or out from the containment vessel. For example, in a removable lid configuration of the first end 210, a component may simply be lifted out through the top and a new component dropped in thereafter. This configuration is particularly advantageous in submerged environments, such as, for example, in a spent fuel pool, wherein the remote manipulation of components can be complicated.

In various examples, the second 220 is the bottom end of the containment vessel 200. The second end 220 can be adapted to facilitate a transfer of an irradiation target into and/or out of the target irradiation apparatus 100. For example, the second end 220 can be configured to include a plurality of penetrations 222 extending from the outer surface to the inner surface. The second end 220 can be adapted to couple to an irradiation target insert transfer system. For example, the plurality of penetrations 222 can be configured to accept a rabbit guide member. In some examples, the profile of each of the plurality of penetrations 222 is dimensioned to be substantially the same as, or slightly larger than, a rabbit guide tube.

In various examples, the body section 230 can includes a plurality of openings 232. Each of the plurality of openings 232 can be adapted to fit a radiation shield plug. The plurality of openings 232 can be axially distributed along a length of the body section. In some examples, the plurality of openings 232 may be confined to being distributed within a portion of the length of the body section 230. The body section 230 can optionally include a plurality of neutron generator supports 238 positioned on the inner surface of the body section 230 to provide structural support for an inserted ENG insert device 300 as shown in FIG. 1.

The support member 240 is adapted to facilitate a transfer of an irradiation target into and/or out of the target irradiation apparatus 100. For example, the support member 240 can include a plurality of channels 242 in axial alignment with one of the plurality of penetrations 222. In some examples, each of the plurality of channels 242 can be longitudinally oriented. In certain examples, each of the plurality of channels 242 has a cross section geometry that is substantially the same as, or slightly larger than, the cross section geometry of an irradiation target insert.

The support member 240 includes a first face and a second face. In various examples, a first face of the support member 240 is oriented towards the inner surface of the second end 220 and a second face of the support member 240 opposes the first face. In some examples, the first face of the support member can be oriented downwards while the second face of the support member can be oriented upwards. The support member can also include at least one flowpath 244 in fluid communication with the region surrounding the support member. In some examples, the second face can include at least one bore (not shown). In certain implementations, the at least one flowpath 244 is in fluid communication with at least one bore of the second face.

In some examples, the containment vessel 200 can include a fluid inlet 234 and a fluid outlet 236, both providing a fluid communication between an interior region of the containment vessel and a region outside of the containment vessel. The fluid inlet 234 and the fluid outlet 236 can be adapted to removably couple to a coolant circulation system. In certain examples, the fluid inlet 234 and the fluid outlet 236 can independently comprise a pipe connection flange. Other fluid connection types are contemplated by the present disclosure. For example, in some implementations, a fluid inlet and a fluid outlet may independently comprise a tube stub, a compression-based coupling, a flared coupling, a push to connect coupling, a quick disconnect coupling, a straight or tapered thread pipe coupling, a bulkhead coupling, a threaded pipe coupling, a barbed coupling, a cam and groove coupling, or any other suitable reusable fluid coupling.

Figure 2:
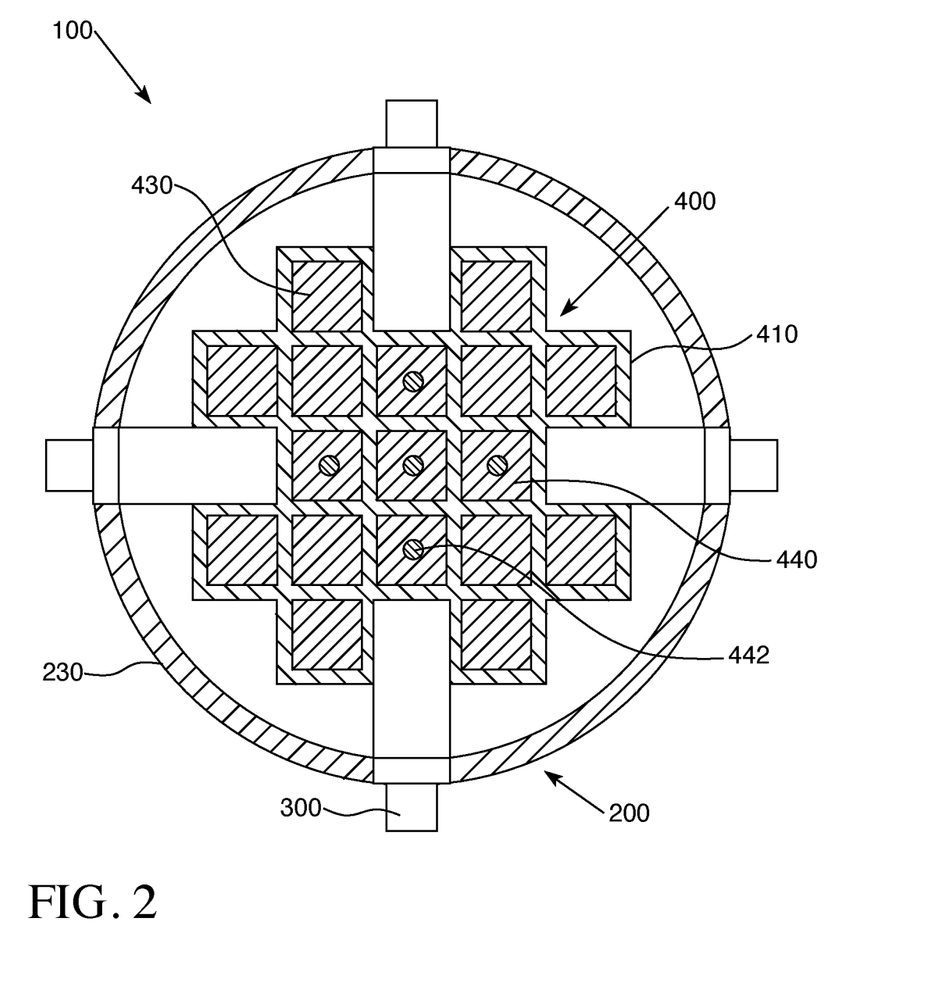
FIG. 2 is a schematic representation of a radial cross section of a target irradiation apparatus, in accordance with at least one non-limiting aspect of the present disclosure.

FIG. 2 depicts a schematic representation of a radial cross section of a target irradiation apparatus 100, in accordance with at least one non-limiting aspect of the present disclosure. In some examples, the containment vessel 200 can be configured with a cylindrical geometry or other tubular shape. In a cylindrical configuration of the containment vessel 200, the plurality of openings may be arranged to provide ENG insert devices 300 at various radial positions as shown in FIG. 2. Other configurations are contemplated by the present disclosure. For example, in some implementations, a containment vessel 200 can be configured with a cubical geometry or a rectangular-prism geometry. In various examples, the plurality of side openings 232 may be arranged at various axial positions as shown in FIG. 1.

Figure 3:
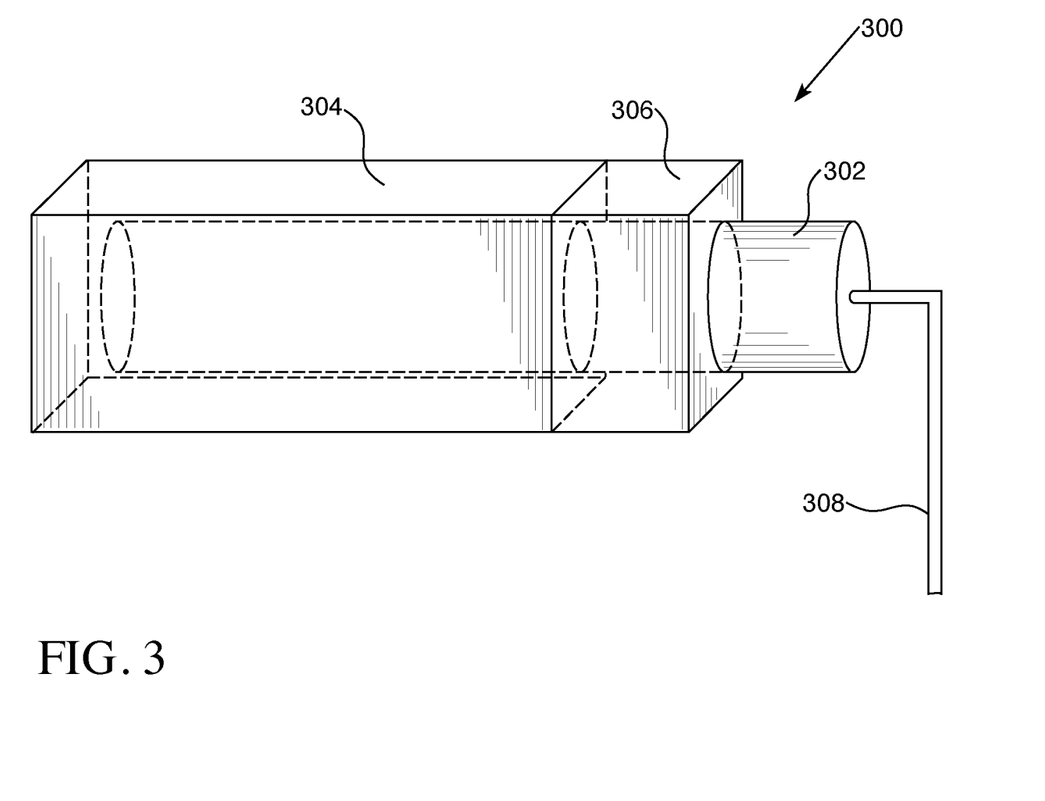
FIG. 3 is a perspective view of an ENG insert device, in accordance with at least one non-limiting aspect of the present disclosure.

FIG. 3 depicts a perspective view of an ENG insert device 300, in accordance with at least one non-limiting aspect of the present disclosure. Each of the plurality of ENG insert devices 300 is configured to be inserted into one of the openings 232.

In various examples, each of the plurality of ENG insert devices 300 comprises an electronic neutron generator tube 302, a neutron moderator section 304 disposed within the containment vessel, a metallic sheath (not shown) configured to enclose the neutron moderator section 304, a radiation shield plug section 306, and a power supply cable 308. In various examples, the electronic neutron generator tube 302 can comprise deuterium, tritium, or a combination thereof. In some examples, the electronic neutron generator tube has a length of about 30 inches or less. In some examples, the electronic neutron generator tube has a diameter of about 7 inches or less.

In various examples, the neutron moderator section 304 comprises a solid neutron moderator material. In some examples, the neutron moderator section 304 can comprise high density polyethylene. The thickness of the neutron moderator section can be configured to provide a desired thermal neutron flux output from the ENG insert device. The metallic sheath comprises a material substantially transparent to thermal neutrons. In some examples, the metallic sheath can comprise a thin layer of aluminum. The radiation shield plug section 308 can comprise a material effective for reducing and/or eliminating an intensity of ionizing radiation outside of the containment vessel. In some examples, the radiation shield plug section 308 can comprise Lead.

Now referring to FIGS. 1-2, the dimensions and/or geometry of the ENG insert device 300 can be configured to ensure that an ENG insert device 300 can be removably inserted and/or nested in one of the openings 232. In various examples, the dimensions of the radiation shield plug 306 are configured to be substantially the same or slightly smaller than a side opening 232. The configuration of the ENG insert devices facilitates the rearrangement thereof to provide the advantage of optimizable source neutron flux distribution within the target irradiation apparatus 100. For example, in some implementations, a body section 230 may have more openings than ENG insert devices, allowing the plurality of ENG insert devices to be removed and rearranged until a desirable source neutron flux distribution is obtained. In certain implementations, the plurality of ENG insert devices 300 can be arranged to distribute a source neutron flux along the active fuel length of a spent fuel assembly inserted into a removable neutron enhancement cartridge 400.

Still referring to FIGS. 1-2, the removable neutron enhancement cartridge 400 includes a cell structure 410. The cell structure 410 is adapted to be removably inserted into the containment vessel 200. For example, the dimensions and/or geometry of the cell structure may be configured to be easily inserted and/or nested within the containment vessel 200 between ENG insert devices 300. In various examples, the removable neutron enhancement cartridge 400 is configured to be positioned on the second face of the support member 240 within the containment vessel 200 upon insertion of the removable neutron enhancement cartridge.

Figures 4, 5:
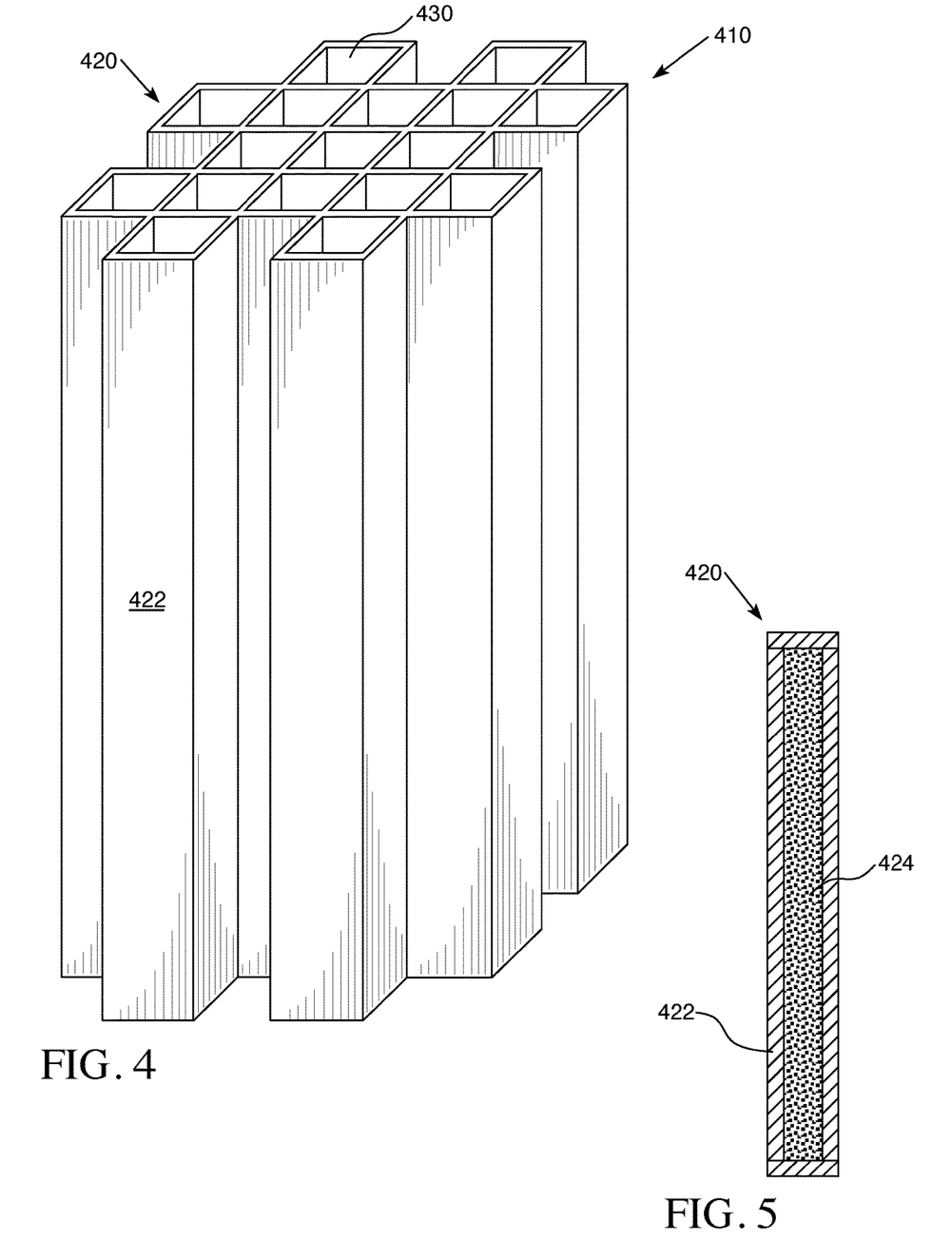
FIG. 4 is a perspective view of a cell structure, in accordance with at least one non-limiting aspect of the present disclosure.
FIG. 5 is a schematic representation of a panel cross-section, in accordance with at least one non-limiting aspect of the present disclosure.

Referring to FIG. 4, a perspective view of a cell structure 410 is provided, in accordance with at least one non-limiting aspect of the present disclosure. The cell structure 410 comprises a plurality of panels 420 configured to form one or more cell volumes 430. The dimensions and/or geometry of each panel 420 can be configured to provide a desired arrangement and/or spacing of cell volumes 430. In various examples, the plurality of panels 420 are arranged to form an array of cell volumes 430. In some examples, the plurality of panels 420 are arranged to form an array having a 2-dimensional grid configuration as shown in FIG. 4. In the array configuration, the array can be dimensioned to house a number of neutron enhancer assemblies suitable for receiving a source neutron flux from the plurality of ENG inserts to thereby produce a subcritical neutron population suitable for a commercial medical radioisotope production. For example, a 2-dimensional grid may have independent integer dimensions A and B forming an A×B array of cell volumes 430, wherein A and B can each be any integer greater than 1. In one example, the plurality of panels 420 are arranged to form a 17×17 array of cell volumes 430. Other array configurations are contemplated by the present disclosure. For example, in some implementations, a plurality of panels 420 can be configured to form at least one uniform linear array, a hexagonal array, a circular array, or a 3-dimensional grid array.

Now referring to FIGS. 1-2 and 4, at least one of the one or more cell volumes 430 can be adapted to be accessible by a transfer system for an irradiation target insert through the second section 220. For example, the arrangement of cell volumes can be configured to position a cell volume 430 in axial alignment with one of the plurality of penetrations 222. In various examples, at least one cell volume 430 may be arranged to be centered around one of the plurality of penetrations 222 and/or a channel 242 upon insertion of the removable neutron enhancement cartridge 400 into the containment vessel 200. In some implementations, the arrangement of the cell volumes is configured to provide each of the penetrations 222 with access to an axial center of a cell volume.

The dimensions and/or geometry of the one or more cell volumes 430 can be configured to ensure that a neutron enhancer assembly 440 can be easily inserted and/or nested in the one or more cell volumes 430. In various examples, the axial length of the one or more cell volumes 430 is configured to be substantially the same as, or slightly longer than, the axial length of a neutron enhancer assembly 440. In some examples, the axial length of the one or more cell volumes 430 is configured to be substantially the same as, or slightly longer than, the axial length of a spent fuel assembly. In certain examples, the axial length of at least one of the one or more cell volumes is configured to be about 12 feet. In various examples, the cross-section geometry of the one or more cell volumes 430 is configured to be substantially the same as, or slightly larger than, the cross-section geometry of a neutron enhancer assembly 440. In some examples, the cross-section geometry of at least one of the one or more cell volumes 430 is configured to be substantially the same as, or slightly larger than, a cross-section geometry of a spent fuel assembly. In certain examples, the projected cross section geometry of each of the one or more cell volumes 430 can be configured to fit within a square having sides from 5 inches to 9 inches in length.

The removable neutron enhancement cartridge 400 can be adapted to couple with a transfer system for cartridges. For example, the cell structure 410 can include a mechanical interface configured to provide a releasable coupling with a handling tool. In certain examples, the removable neutron enhancement cartridge 400 may be equipped with a coupling member to interface with a lifting and/or lowering tool for a spent fuel assembly. In one example, the removable neutron enhancement cartridge 400 is equipped with a coupling member to interface with a grapple.

The configuration of the cell structure 410 can optimize the logistic and safety issues associated with replacing a neutron enhancement cartridge. For example, in certain implementations, existing equipment in a spent fuel pool at a storage site may be employed to move a cell structure 410 equipped with a coupling member to interface with a lifting and/or lowering tool for a spent fuel assembly while safely submerged. Spare cell structures submerged in a spent fuel pool of a storage facility can also be populated with spent fuel assemblies contained therein to build an inventory of pre-loaded, ready-to-use neutron enhancement cartridges. Thus, the time required between removing a neutron enhancement cartridge 400 from a submerged containment vessel and inserting a pre-loaded neutron enhancement cartridge into the containment vessel can be minimized without losing the inherent benefit of safety of performing operations while submerged.

The removable neutron enhancement cartridge 400 is adapted to produce a neutron flux proportionally greater than a neutron flux provided by an ENG insert device 300. For example, the at least one neutron enhancer assembly 440 can comprise a neutron multiplication material configured to provide sub-critical multiplication of neutrons. In various examples, the at least one neutron enhancer assembly 440 comprises spent nuclear fuel. In some examples, the at least one neutron enhancer assembly 440 comprises spent fuel assembly having a $K_\infty$ value of less than 1. In certain examples, the at least one neutron enhancer assembly 440 comprises a spent fuel assembly having a $K_\infty$ value of 0.99 or less.

The $K_{eff}$ of an array of fuel assemblies can be determined with known methods employing the neutron reproduction factor for an infinite array of a specific fuel assembly of the array $K_\infty$, which represents the upper limit of neutron multiplication for the specific fuel assembly. In subcritical conditions, wherein $K_{eff}$ is less than 1, the subcritical multiplication mechanism multiplies a source neutron flux N by a subcritical multiplication factor M via fission interactions between the source neutrons and the array of fissile fuel assemblies to net a fuel assembly neutron flux $N_A$, as shown in the following relations:

$$N_A = M \times N;$$
$$M = \frac{1}{1-K_{eff}}.$$

The configuration of the neutron enhancement cartridge 400 can provide an advantage of operation safety without relying on complicated control of a nuclear reaction. For example, a neutron enhancement cartridge 400 comprising an array of spent fuel assemblies having a $K_\infty$ of less than 1 will halt neutron production as soon as the ENG insert devices 300 are powered off because an array of spent fuel assemblies having a $K_\infty$ of less than 1 is incapable of producing neutrons in a self-sustaining fission reaction.

Upon powering on the plurality of ENG insert devices 300, the thermal neutron flux produced by the ENG insert devices can interact with the neutron multiplication material of an inserted neutron enhancement cartridge. For example, an incident thermal neutron flux on the order of about $10^9$ neutrons/cm$^2$/second produced by the ENG insert devices 300 may interact with an array of spent fuel assemblies having a $K_\infty$ of 0.99, thereby producing a multiplied neutron flux on the order of about $10^{11}$ neutrons/cm$^2$/second.

The neutron enhancer assembly 440 can include an axial flow channel terminated by a coolant inlet at a first end and a coolant outlet at a second end. In various configurations, the first end of the neutron enhancer assembly 440 is positioned to face the support member 240 while the second end of the neutron enhancer assembly is positioned closest to the first end 210. The target irradiation apparatus 100 can be adapted to pass coolant through the neutron enhancer assembly 440. For example, in some implementations, the support member 240 may include at least one bore positioned within the boundaries of at least one cell volume containing a neutron enhancer assembly 440 configured with an axial flow channel. Advantageously, this configuration provides a fluid communication between flowpath 244 and the coolant outlet at the second end of the neutron enhancer assembly 440. Thus, when a coolant circulation system is connected to a containment vessel configured with a fluid inlet 234 and a fluid outlet 236, the fluid inlet 234 may provide coolant to a coolant inlet of the neutron enhancer assembly 440 and coolant exiting the coolant outlet of the neutron enhancer assembly 440 may be recovered at the fluid outlet 236.

In certain implementations, the target irradiation apparatus 100 can provide the advantages of producing a thermal neutron flux sufficient for commercial medical radioisotope production without sacrificing availability and/or safety. For example, since the neutron enhancer assembly 440 can be configured as a spent fuel assembly, the removable neutron enhancement cartridge 400 may be loaded remotely in a spent fuel pool where spent fuel assemblies are readily and/or safely accessible away from any operating nuclear reactor, thereby avoiding any perturbation of operating reactor conditions and the inherent dangers thereof. Additionally, in some implementations, the plurality of ENG insert devices 300 may simply be powered off and/or coolant may be introduced into the target irradiation apparatus to mitigate undesirable thermal process conditions in the unlikely event that too much heat is produced inside of the target irradiation apparatus.

Now referring to FIGS. 1-3, at least one neutron enhancer assembly 440 includes an inner housing 442. The inner housing 442 is adapted to house an irradiation target insert. For example, the dimensions and/or geometry of the inner housing 442 can be configured to be substantially the same as, or slightly longer than, the axial length of an irradiation target insert. In various examples, the axial length of the inner housing 442 is configured to extend from a first axial end of a neutron enhancer assembly 440 to a region inside the neutron enhancer assembly. In some examples, the cross-section geometry of the inner housing 442 is configured to be substantially the same as, or slightly larger than, the cross-section geometry of an irradiation target insert. In certain examples, the inner housing 442 is an insertion thimble of a spent fuel assembly.

In some examples, upon insertion of an irradiation target insert into the inner housing 442, the neutron flux provided by the at least one neutron enhancer assembly 440 may interact with the irradiation target insert material to produce a medical radioisotope. For example, upon powering on a plurality of ENG insert devices 300, an irradiation target insert comprising Molybdenum-98 positioned within an inner housing 442 may be irradiated with a neutron flux sufficient to produce Molybdenum-99.

The inner housing 442 can be adapted to optimize a transfer of an irradiation target insert. For example, the positioning of an inner housing 442 can be configured to align the inner housing 442 with one of the plurality of channels 242. In various examples, at least one inner housing 442 of an inserted removable neutron enhancement cartridge 400 is in axial alignment with one of the plurality of channels 242. In some implementations, the axial alignment of the inner housing 442 and one of the plurality of channels 242 can provide an entry and/or exit path for an irradiation target insert through one of the plurality of penetrations 222 in axial alignment with the one of the plurality of channels 242, thereby providing the advantage of transferring an irradiation target insert into and/or out from the neutron enhancement cartridge 400 without requiring any disassembly of the target irradiation apparatus 100.

Referring to FIG. 5, a schematic view of a panel 420 is provided, in accordance with at least one non-limiting aspect of the present disclosure. Each of the panels 420 comprises an outer metallic shell 422. In various examples, the outer metallic shell 422 can comprise a material transparent to ionizing radiation. In some examples, the outer metallic shell 422 can comprise aluminum.

Each of the plurality of panels 420 can be adapted to moderate fast neutrons and/or absorb gamma radiation to provide a thermal neutron flux. For example, the panels can be configured to comprise a neutron moderating material, a photoneutron source, or a combination thereof. In various examples, the panels 420 can comprise carbon and/or beryllium. In some examples, the panels 420 can comprise a graphite. In some panel configurations, the outer metallic shell 422 can enclose a fill mixture 424 comprising graphite and beryllium as shown in FIG. 5. In certain examples, the fill mixture 424 may be hermetically sealed.

The configuration of the panels 420 can increase the efficiency of subcritical multiplication during operation of the target irradiation apparatus 100. For example, in some examples, the panel 420 may convert any incident fast neutrons and/or gamma radiation incident of the neutron enhancer assembly 440 into an incident thermal neutron flux.

Figure 6:
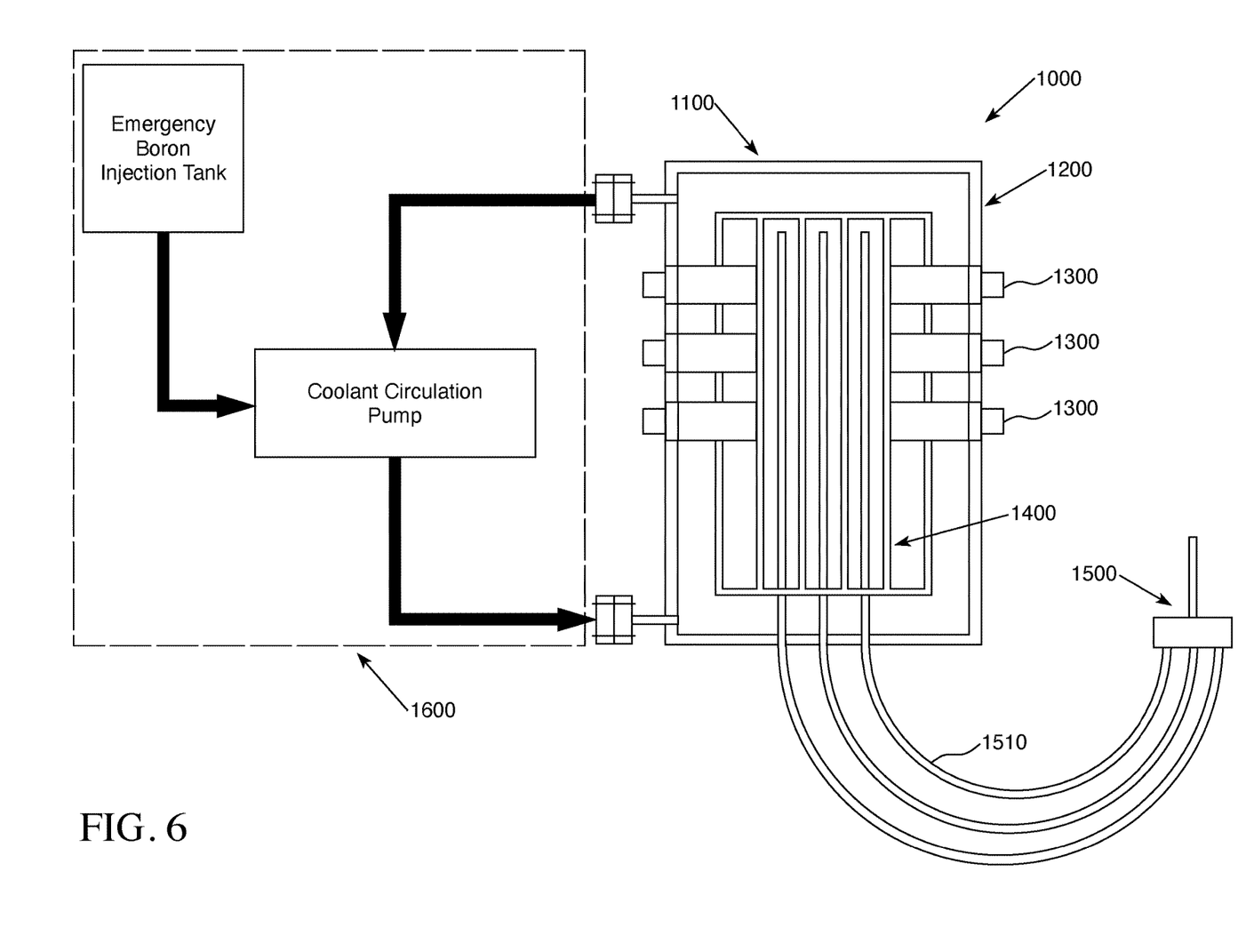
FIG. 6 is a schematic representation of a radioisotope production system, in accordance with at least one non-limiting aspect of the present disclosure.

FIG. 6 depicts a schematic representation of a radioisotope production system 1000 including a neutron multiplication apparatus 1100, at least one removable neutron enhancement cartridge 1400, and a detachable transfer system 1500 in accordance with at least one non-limiting aspect of the present disclosure. The neutron multiplication apparatus 1100 includes a containment vessel 1200 having an inner surface and an outer surface, and a plurality of electronic neutron generator insert devices 1300. The containment vessel 1200 is similar in many respects to other containment apparatus disclosed elsewhere in the present disclosure, which are not repeated herein at the same level of detail for brevity. In various examples, the containment vessel 1200 can include a top end; a bottom end comprising a plurality of longitudinally oriented openings extending from the outer surface to the inner surface; a body section extending longitudinally between the top end and the bottom end, the body section comprising a plurality of side openings, wherein each of the plurality of side openings is adapted to fit a radiation shield plug; and a bottom support member (not shown) positioned on the inner surface above the bottom end, the bottom support member comprising a plurality of longitudinally oriented channels, wherein the longitudinally oriented channels are in alignment with the longitudinally oriented openings of the bottom end. In some examples, the top end can comprise a removable vessel lid and the bottom end can be adapted to reversibly couple with the detachable transfer system 1500. In various examples, each of the plurality of electronic neutron generator insert devices 1300 is laterally inserted into one of the plurality of side openings of the containment vessel 1200 as shown in FIG. 6. The containment vessel 1200 can optionally include a first fluid port and a second fluid port, both fluid ports adapted to removably couple to a coolant circulation system.

The radioisotope production system 1000 can optionally include a coolant circulation system 1600 removably connected to the first fluid port and the second fluid port of the containment vessel 1200. The coolant circulation system 1600 is adapted to remove excess heat from a neutron enhancement cartridge 1400 inserted into a containment vessel 1200. For example, the coolant circulation system can be configured with a cold side to provide a boron-based coolant to the first fluid port of the containment vessel 1200 and a hot side to recover the coolant from the second fluid port of the containment vessel 1200. In some examples, the containment vessel 1200 is adapted to direct at least a portion of the coolant provided to the first coolant port through the at least one removable neutron enhancement cartridge 1400, upon insertion of the at least one removable neutron enhancement cartridge 1400 into the containment vessel 1200.

Still referring to FIG. 6, the at least one removable neutron enhancement cartridge 1400 includes a cell structure comprising an array of cell volumes, and can be configured similarly to a neutron enhancement cartridge 400 as described hereinabove. Thus, the at least one removable neutron enhancement cartridge 1400 can be adapted to fit on the bottom support member inside the containment vessel 1200 and house a neutron enhancer assembly and/or an irradiation target insert in alignment with one of the plurality of longitudinally oriented channels of the bottom support member. In some implementations, each cell volume of the neutron enhancement cartridge 1400 may be configured to be in fluid communication with a first fluid port and a second fluid port of a containment vessel 1200.

The configuration of the removable neutron enhancement cartridge 1400 can minimize any changeover delays and/or safety issues associated therewith. For example, in some implementations, spare neutron enhancement cartridges can independently be submerged in a spent fuel pool of a storage facility for spent fuel assemblies and populated therewith to build an inventory of pre-loaded neutron enhancement cartridges. A containment vessel requiring a neutron enhancement cartridge replacement can be quickly unloaded and reloaded upon submerging the irradiation target apparatus in the spent fuel pool, thereby minimizing any exposure to ionizing radiation from fuel assemblies in storage and/or any accumulation of downtime during changeover that could otherwise be used for irradiating targets. Thus, the configuration of the removable neutron enhancement cartridge 1400 can optimize the safety and logistics of a commercial scale production of medical radioisotopes.

The detachable transfer system 1500 include at least one conveying member 1510. In various examples, each of the at least one conveying members 1510 is reversibly coupled to one of the plurality of longitudinally oriented openings of the containment vessel 1200. The conveying member 1510 can be adapted to guide an irradiation target insert into and/or out of the at least one removable neutron enhancement cartridge 1400, upon insertion of the at least one removable neutron enhancement cartridge 1400 into the containment vessel 1200. For example, the conveying member 1510 can be a guide tube having a cross section geometry slightly larger than the cross-section geometry of an irradiation target insert. The detachable transfer system 1500 can be configured to convey an irradiation target insert pneumatically or mechanically. In various examples, the detachable transfer system 1500 is cable driven. In some examples, the detachable transfer system 1500 can include a cable drive assembly adapted to mechanically couple to a first end of an irradiation target insert. In certain examples, the cable drive assembly is adapted to traverse a path that is axially aligned with the conveying member 1510.

Upon detachment or attachment of the transfer system 1500 in a radioisotope production system 1000 submerged in a spent fuel pool, liquid may encroach the plurality of longitudinally oriented openings and/or the conveying members 1510. The configuration of the detachable transfer system 1500 can provide the benefit of fast and reliable recovery of irradiated target inserts by providing a rapid coupling and/or decoupling from the containment vessel 1200 without relying on maintaining a closed gas loop. For example, in a cable driven configuration, the transfer system 1500 can provide the necessary force to overcome obstacles associated with slight misalignment and/or encroaching liquid which can be challenging to correct with conventional pneumatic systems.

As discussed hereinabove, the benefits provided by the configuration of the radioisotope production system 1000 can optimize technical and economic aspects of producing medical radioisotopes such as, for example, accessibility of high flux neutron sources for irradiating target inserts, efficient recovery of irradiated targets and operation safety.

As described herein, the radioisotope production system 1000 can be incorporated into a production method. For example, a method for producing a radioisotope source can include initializing a radioisotope production system and producing a radioisotope source. The initializing step can include submerging a first neutron enhancement cartridge in a spent fuel pool; populating the first neutron enhancement cartridge with at least one spent fuel assembly to obtain a; submerging an open radioisotope production system into the spent fuel pool, the open radioisotope production system comprising an array of ENG insert devices; loading the freshly populated first neutron enhancement cartridge into the submerged radioisotope production system; closing the loaded radioisotope production system; and inserting an irradiation target into the closed radioisotope production system. The producing step of the method can include providing power to the array of ENG insert devices to irradiate the inserted irradiation target; and withdrawing the irradiated target from the closed radioisotope production system to produce the radioisotope source. The method for producing radioisotopes can be adapted for various applications. For example, the method for producing radioisotopes can be adapted to produce short lived medical radioisotopes.

The first neutron enhancement cartridge can have a neutron reproduction factor $K_{eff}$ based in part on the configuration of the populated first neutron enhancement cartridge. For example, the discharge burnup and the final arrangement of the at least one spent fuel assembly can be configured to obtain a populated first neutron enhancement cartridge with a desired neutron reproduction factor $K_{eff}$. In some examples, the freshly populated first neutron enhancement cartridge can have a neutron reproduction factor $K_{eff}$ less than 1. In certain examples, the neutron reproduction factor $K_{eff}$ comprises a $K_\infty$ factor of less than 1. Since a neutron enhancement cartridge having a $K_\infty$ of less than 1 is inherently limited to subcritical multiplication of neutrons, the radioisotope production system employed in a method as described hereinabove may be configured to produce a neutron flux reliant on a flux provided by the array of ENG insert devices, thereby avoiding a runaway of neutron multiplication during startup or a continued neutron production after shutdown. Thus, the method for producing radioisotope sources can provide the benefit of prompt process startup and/or shutdown without compromising safety by providing a neutron flux limited to subcritical multiplication of a neutron flux produced by the array of ENG insert devices.

The method for producing a radioisotope source can additionally include submerging a second neutron enhancement cartridge; populating the second neutron enhancement cartridge to produce a freshly populated second neutron enhancement cartridge having substantially the same $K_{eff}$ as the freshly populated first neutron enhancement cartridge; opening the submerged closed radioisotope production system; and replacing the first neutron enhancement cartridge with the freshly populated second neutron enhancement cartridge. In some implementations, these additional steps can minimize potential delays during a neutron enhancement cartridge replacement. Additionally, in an event when an extension to a radioisotope production schedule is desired after the production has started, spare neutron enhancement cartridges may be prepared in anticipation of the end of life of the final cartridge in line as previously scheduled. Thus, the method can provide the benefit of optimized production scheduling by shortening overall production times and/or flexibly extending production scheduling.

In the event that the demand for radioisotope sources changes during a production of radioisotope sources, the use of a radioisotope production system in a method for producing radioisotope sources as disclosed hereinabove can provide prompt and reliable production of radioisotope sources without compromising production flexibility, thereby avoiding any economic and/or safety issues associated with conventional radioisotope production methods.

Various aspects of the invention according to the present disclosure include, but are not limited to, the aspects listed in the following numbered clauses.

1. A target irradiation apparatus for producing radioisotope sources, the target irradiation apparatus comprising:
    a containment vessel having an inner surface and an outer surface, the containment vessel comprising:
       a first end;
       a second end comprising a plurality of penetrations extending from the outer surface to the inner surface, wherein the second end is adapted to couple to a transfer system for an irradiation target insert;
       a body section extending between the top end and the bottom end, the body section comprising a plurality of openings, wherein each of the plurality of openings is adapted to fit a radiation shield plug; and
       a support member, the support member comprising a plurality of channels, wherein the channels are in alignment with the penetrations of the second end, wherein a first face of the support member is oriented towards the inner surface of the second end;
    a plurality of electronic neutron generator insert devices, wherein each electronic neutron generator insert device is inserted into one of the plurality of openings; and
    a removable neutron enhancement cartridge positioned on a second face of the support member, the neutron enhancement cartridge comprising:
       a cell structure comprising a plurality of panels, wherein the plurality of panels is configured to form at least one cell volume, and wherein each of the plurality of panels comprises an outer metallic shell; and
       a neutron enhancer assembly, wherein the neutron enhancer assembly is configured to be removably inserted into the at least one cell volume and wherein the neutron enhancer assembly is adapted to house an irradiation target insert in alignment with one of the plurality of channels of the support member.
2. The target irradiation apparatus of clause 1, wherein each of the plurality of electronic neutron generator insert devices comprises:
    an electronic neutron generator tube;
    a neutron moderator section;
    a metallic sheath configured to enclose the neutron moderator section;
    a radiation shield plug section; and
    a power supply cable.
3. The target irradiation apparatus of clause 2, wherein the electronic neutron generator tube comprises Deuterium, Tritium, or a combination thereof
4. The target irradiation apparatus of any one of clauses 2-3, wherein the neutron moderator section comprises high density polyethylene.
5. The target irradiation apparatus of any one of clauses 2-4, wherein the metallic sheath comprises Aluminum.
6. The target irradiation apparatus of any one of clauses 2-5, wherein the radiation shield plug section comprises Lead.
7 The target irradiation apparatus of any one of clauses 1-6, wherein the outer metallic shell of each of the plurality of panels comprises a poor thermal neutron absorber material.
8. The target irradiation apparatus of clause 7, wherein the poor thermal neutron absorber material comprises Aluminum.
9. The target irradiation apparatus of any one of clauses 1-7, wherein each of the plurality of panels is filled with a mixture comprising a neutron moderator material and a photo-neutron sensitive material.
10. The target irradiation apparatus of clause 9, wherein the neutron moderator material comprises Carbon.
11. The target irradiation apparatus of clause 9, wherein the photo-neutron sensitive material comprises Beryllium.
12. The target irradiation apparatus of any one of clauses 1-11, wherein the neutron enhancer assembly comprises a subcritical multiplication material.
13. The target irradiation apparatus of clause 12, wherein the neutron enhancer assembly is a spent fuel assembly.
14. The target irradiation apparatus of any one of clauses 1-12, wherein the containment vessel comprises a fluid inlet and a fluid outlet, wherein each neutron enhancer comprises an axial flow channel, and wherein the support member comprises at least one flowpath in fluid communication with the axial flow channel of each neutron enhancer and the fluid inlet of the containment vessel.
15. A radioisotope production system for producing radioisotope sources, the radioisotope production system comprising:
    a neutron multiplication apparatus, the neutron multiplication apparatus comprising:
       a containment vessel having an inner surface and an outer surface, the containment vessel comprising:
          a top end comprising a removable vessel lid;
          a bottom end comprising a plurality of longitudinally oriented openings extending from the outer surface to the inner surface, wherein the bottom end is adapted to couple to a transfer system for an irradiation target insert;
          a body section extending longitudinally between the top end and the bottom end, the body section comprising a plurality of side openings, wherein each of the plurality of side openings is adapted to fit a radiation shield plug; and
          a bottom support member positioned on the inner surface above the bottom end, the bottom support member comprising a plurality of longitudinally oriented channels, wherein the longitudinally oriented channels are in alignment with the longitudinally oriented openings of the bottom end; and
       a plurality of electronic neutron generator insert devices, wherein each electronic neutron generator insert device is laterally inserted into one of the plurality of side openings;
    at least one removable neutron enhancement cartridge adapted to fit inside the containment vessel of the at least one neutron multiplication apparatus on the bottom support member, the at least one removable neutron enhancement cartridge comprising:
       a cell structure comprising an array of cell volumes, wherein each cell volume is configured to house a neutron enhancer assembly, wherein the neutron enhancer assembly is adapted to house an irradiation target insert in alignment with one of the plurality of longitudinally oriented channels of the bottom support member; and
a detachable irradiation target insert transfer system adapted to move the irradiation target through the bottom end of a containment vessel.
16. The radioisotope production system of clause 15, wherein the transfer system comprises a cable drive assembly comprising a cable, wherein an end of the cable is adapted to removably attach the cable to the irradiation target insert.
17. The radioisotope production system of any one of clauses 15-16, wherein the containment vessel includes a first fluid port and a second fluid port, wherein the first fluid port and the second fluid port are adapted to removably couple to a coolant circulation system, and wherein the plurality of cell volumes is adapted to accept a flow of liquid from the first fluid port to pass the flow of liquid to the second fluid port.
18. A method for producing a radioisotope source, the method comprising:
initializing a radioisotope production system, the initializing comprising:
submerging a first neutron enhancement cartridge in a spent fuel pool;
populating the first neutron enhancement cartridge with at least one spent fuel assembly, wherein the freshly populated first neutron enhancement cartridge has a neutron reproduction factor $K_{eff}$;
submerging an open radioisotope production system into the spent fuel pool, the open radioisotope production system comprising an array of electronic neutron generator insert devices;
loading the freshly populated first neutron enhancement cartridge into the submerged radioisotope production system;
closing the loaded radioisotope production system; and
inserting an irradiation target into the closed radioisotope production system; and producing a radioisotope source, the producing comprising:
providing power to the array of electronic neutron generator insert devices to irradiate the inserted irradiation target; and
withdrawing the irradiated target from the closed radioisotope production system to produce the radioisotope source.
19. The method for producing a radioisotope source of clause 18, wherein the neutron reproduction factor $K_{eff}$ is less than 1.
20. The method for producing a radioisotope source of any one of clauses 18-19, wherein the method comprises:
submerging a second neutron enhancement cartridge;
populating the second neutron enhancement cartridge to produce a freshly populated second neutron enhancement cartridge having substantially the same $K_{eff}$ as the freshly populated first neutron enhancement cartridge;
opening the submerged closed radioisotope production system; and
replacing the first neutron enhancement cartridge with the freshly populated second neutron enhancement cartridge.

Various features and characteristics are described in this specification to provide an understanding of the composition, structure, production, function, and/or operation of the invention, which includes the disclosed methods and systems. It is understood that the various features and characteristics of the invention described in this specification can be combined in any suitable manner, regardless of whether such features and characteristics are expressly described in combination in this specification. The Inventors and the Applicant expressly intend such combinations of features and characteristics to be included within the scope of the invention described in this specification. As such, the claims can be amended to recite, in any combination, any features and characteristics expressly or inherently described in, or otherwise expressly or inherently supported by, this specification. Furthermore, the Applicant reserves the right to amend the claims to affirmatively disclaim features and characteristics that may be present in the prior art, even if those features and characteristics are not expressly described in this specification. Therefore, any such amendments will not add new matter to the specification or claims and will comply with the written description, sufficiency of description, and added matter requirements.

With respect to the appended claims, those skilled in the art will appreciate that recited operations therein may generally be performed in any order. Also, although various operational flows are presented in a sequence(s), it should be understood that the various operations may be performed in other orders than those that are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

The invention(s) described in this specification can comprise, consist of, or consist essentially of the various features and characteristics described in this specification. The terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. Thus, a method or system that "comprises," "has," "includes," or "contains" a feature or features and/or characteristics possesses the feature or those features and/or characteristics but is not limited to possessing only the feature or those features and/or characteristics. Likewise, an element of a composition, coating, or process that "comprises," "has," "includes," or "contains" the feature or features and/or characteristics possesses the feature or those features and/or characteristics but is not limited to possessing only the feature or those features and/or characteristics and may possess additional features and/or characteristics.

The grammatical articles "a," "an," and "the," as used in this specification, including the claims, are intended to include "at least one" or "one or more" unless otherwise indicated. Thus, the articles are used in this specification to refer to one or more than one (i.e., to "at least one") of the grammatical objects of the article. By way of example, "a component" means one or more components and, thus, possibly more than one component is contemplated and can be employed or used in an implementation of the described compositions, coatings, and processes. Nevertheless, it is understood that use of the terms "at least one" or "one or more" in some instances, but not others, will not result in any interpretation where failure to use the terms limits objects of the grammatical articles "a," "an," and "the" to just one. Further, the use of a singular noun includes the plural, and the use of a plural noun includes the singular, unless the context of the usage requires otherwise.

In this specification, unless otherwise indicated, all numerical parameters are to be understood as being prefaced and modified in all instances by the term "about," in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described herein should at least be construed in light of the number of reported significant digits and by applying ordinary rounding techniques.

Any numerical range recited herein includes all subranges subsumed within the recited range. For example, a range of "1 to 10" includes all sub-ranges between (and including) the recited minimum value of 1 and the recited maximum value of 10, that is, having a minimum value equal to or greater than 1 and a maximum value equal to or less than 10. Also, all ranges recited herein are inclusive of the end points of the recited ranges. For example, a range of "1 to 10" includes the end points 1 and 10. Any maximum numerical limitation recited in this specification is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited. All such ranges are inherently described in this specification.

As used in this specification, particularly in connection with layers, the terms "on," "onto," "over," and variants thereof (e.g., "applied over," "formed over," "deposited over," "provided over," "located over," and the like) mean applied, formed, deposited, provided, or otherwise located over a surface of a substrate but not necessarily in contact with the surface of the substrate. For example, a layer "applied over" a substrate does not preclude the presence of another layer or other layers of the same or different composition located between the applied layer and the substrate. Likewise, a second layer "applied over" a first layer does not preclude the presence of another layer or other layers of the same or different composition located between the applied second layer and the applied first layer.

Whereas particular examples of this invention have been described above for purposes of illustration, it will be evident to those skilled in the art that numerous variations of the details of the present invention may be made without departing from the invention as defined in the appended claims.

What is claimed is:

1. A target irradiation apparatus for producing radioisotope sources, the target irradiation apparatus comprising:
    a containment vessel having an inner surface and an outer surface, the containment vessel comprising:
        a first end;
        a second end comprising a plurality of penetrations, wherein the plurality of penetrations extend from the outer surface of the containment vessel to the inner surface of the containment vessel, wherein the second end is adapted to couple to a transfer system for an irradiation target insert;
        a body section extending between the first end and the second end, the body section comprising a plurality of openings; and
        a support member, the support member comprising a plurality of channels, wherein the channels are in alignment with the plurality of penetrations of the second end, wherein a first face of the support member is oriented towards the second end of the containment vessel;
    a plurality of electronic neutron generator insert devices, each of the plurality of electronic neutron generator insert device comprising an electronic neutron generator tube, wherein the electronic neutron generator tube comprises Deuterium, Tritium, or a combination thereof, wherein each of the plurality of electronic neutron generator insert devices is configured to produce a neutron flux when a power source is turned on, and wherein each of the plurality of openings is configured to fit a respective one of the electronic neutron generator insert devices;
    a removable neutron enhancement cartridge positioned on a second face of the support member, the neutron enhancement cartridge comprising:
        a cell structure comprising a plurality of panels, wherein the plurality of panels is configured to form at least one cell volume; and
        a neutron enhancer assembly comprising a subcritical multiplication material, wherein the neutron enhancer assembly is configured to be removably inserted into the at least one cell volume; and
    an irradiation target, wherein the neutron enhancer assembly is configured to house the irradiation target in alignment with one of the plurality of channels of the support member.

2. The target irradiation apparatus as claimed in claim 1, wherein each of the plurality of electronic neutron generator insert devices further comprises:
    a neutron moderator section;
    a radiation shield plug section, wherein the respective radiation shield plug section is configured to be inserted into one of the plurality of openings; and
    a power supply cable.

3. The target irradiation apparatus as claimed in claim 2, wherein the neutron moderator section comprises high density polyethylene.

4. The target irradiation apparatus as claimed in claim 2, wherein the radiation shield plug section comprises Lead.

5. The target irradiation apparatus as claimed in claim 1, wherein each of the plurality of panels comprises an outer metallic shell.

6. The target irradiation apparatus as claimed in claim 5, wherein the outer metallic shell comprises Aluminum.

7. The target irradiation apparatus as claimed in claim 1, wherein each of the plurality of panels is filled with a mixture comprising a neutron moderator material and a photo-neutron source material.

8. The target irradiation apparatus as claimed in claim 7, wherein the neutron moderator material comprises Carbon.

9. The target irradiation apparatus as claimed in claim 7, wherein the photo-neutron source material comprises Beryllium.

10. The target irradiation apparatus as claimed in claim 1, wherein the subcritical multiplication material comprises spent fuel.

11. The target irradiation apparatus as claimed in claim 1, wherein the containment vessel comprises a fluid inlet and a fluid outlet, wherein the neutron enhancer assembly comprises an axial flow channel, and wherein the support member comprises at least one flowpath in fluid communication with the axial flow channel of the neutron enhancer assembly and the fluid inlet of the containment vessel.

12. The target irradiation apparatus as claimed in claim 1, wherein a neutron flux from the removable neutron enhancement cartridge is larger than the neutron flux from one of the plurality of electronic neutron generator insert devices.

13. The target irradiation apparatus as claimed in claim 1, wherein the neutron flux from one of the plurality of electronic neutron generator insert devices is on the order of $10^9$ neutrons/cm$^2$/second, and wherein a neutron flux from the removable neutron enhancement cartridge is on the order of $10^{11}$ neutrons/cm$^2$/second.

14. The target irradiation apparatus as claimed in claim 1, wherein the irradiation target comprises Mo, Lu, or Ac.

15. The target irradiation apparatus as claimed in claim 1, wherein the removable neutron enhancement cartridge has a neutron reproduction factor $K_{eff}$ of less than 1.

16. The target irradiation apparatus as claimed in claim 1, wherein a number of the plurality of openings is greater than a number of the plurality of electronic neutron generator insert devices.

17. The target irradiation apparatus as claimed in claim 1, further comprising a coolant system operably detachable from the containment vessel.

* * * * *